United States Patent [19]
Grant

[11] Patent Number: 5,106,404
[45] Date of Patent: Apr. 21, 1992

[54] EMISSION CONTROL SYSTEM FOR FLUID COMPOSITIONS HAVING VOLATILE CONSTITUENTS AND METHOD THEREOF

[75] Inventor: David C. H. Grant, Selbyville, Del.

[73] Assignee: Baxter International Inc., Deerfield, Ill.

[21] Appl. No.: 581,020

[22] Filed: Sep. 12, 1990

[51] Int. Cl.$^5$ .............................................. B01D 19/00
[52] U.S. Cl. ................................... 55/195; 55/208
[58] Field of Search .................................. 55/40–48, 55/50, 51, 55, 71, 89, 189, 195, 208

[56] References Cited

U.S. PATENT DOCUMENTS

| | | | |
|---|---|---|---|
| 2,129,299 | 9/1938 | Bichowsky | 55/50 |
| 4,048,007 | 9/1977 | Valle-Riestra | 55/51 X |
| 4,066,423 | 1/1978 | McGill et al. | 55/48 |
| 4,261,707 | 4/1981 | Bradshaw et al. | 55/48 |
| 4,265,642 | 5/1981 | Mir et al. | 55/48 X |
| 4,383,838 | 5/1983 | Barten et al. | 55/48 |
| 4,528,001 | 7/1985 | Yokogawa et al. | 55/48 X |
| 4,574,005 | 3/1986 | Cobbs, Jr. et al. | 55/48 |
| 4,708,721 | 11/1987 | Ehrler | 55/40 |
| 4,902,310 | 2/1990 | Vara et al. | 55/46 |

FOREIGN PATENT DOCUMENTS 3124388 2/1983 Fed. Rep. of Germany .......... 55/46

Primary Examiner—Robert Spitzer
Attorney, Agent, or Firm—Foley & Lardner

[57] ABSTRACT

A system and method for controlling atmospheric emission of volatile materials such as solvents, used to clean or treat articles incident to their manufacture comprising a treatment chamber and a recirculating closed loop gas and solvent recovery system. The chamber is isolated from the closed loop system, the article to be treated is put into the chamber, the chamber is sealed and gases removed by evacuation, these gases being discharged outside the closed loop system. The articles are treated with solvent, dried with a fluid derived in the solvent recovery system from noncondensable gas, residual in the system. Drying is effected by passing the recovered gases from the closed loop system through the chamber and by evacuation. The gas evacuated from the chamber, containing solvent vapor is retained within the closed loop system. The chamber is vented to outside the closed loop system prior to removing the treated item.

21 Claims, 1 Drawing Sheet

EMISSION CONTROL SYSTEM FOR FLUID COMPOSITIONS HAVING VOLATILE CONSTITUENTS AND METHOD THEREOF

FIELD OF THE INVENTION

The present invention relates, generally, to emission control systems for minimizing the atmospheric introduction of volatile constituents from fluid compositions used to treat articles as part of or incident to a manufacturing procedure, and a method having the same aim. The present invention more particularly relates to a vacuum-to-vacuum emission control system for reducing the atmospheric introduction of volatile organic compounds, especially cleaning solvents and most especially chlorofluorocarbon cleaning solvents. The present invention provides a closed loop solvent recovery system having the ability to control solvent consumption performance to a level considerably less than 1% of that experienced with conventional degreasers. Dragout losses for those products in which solvent is irretrievably absorbed will be somewhat higher.

BACKGROUND OF THE INVENTION

Volatile organic compounds are known to pose health and environmental hazards. On the one hand, ozone depletion and global warming are now attributed to such factors as the release of copious quantities of chlorofluorocarbons (CFC's) and similar volatile compounds. On the other hand, inhalation of volatile constituents, particularly solvents or similar compounds used in a wide range of manufacturing procedures, is known to result in potentially severe health hazards. In all such cases, the characteristics which make these compositions particularly desirable in manufacturing procedures, such as the efficacy of a composition as a solvent or cleaning agent (e.g., volatility), are directly responsible for the deleterious or potentially deleterious effects accompanying their use.

Systems have been devised to minimize solvent loss during or incident to procedures in which these volatile compositions have a tendency to escape to the atmosphere. Some are recovery systems designed to retrieve the fluid and entrained materials resulting from a manufacturing procedure, such as a cleaning procedure, and thence separate the reusable fluid from contaminants. These systems tend to have common limitations or drawbacks. For example, air is often allowed to enter the system and mix with vapor, whereupon removal of the air necessarily implicates loss of volatile constituents as well. More direct sources of solvent loss may be attributed to diffusion, "dragout," and system leaks.

Indirect solvent loss, as in the case of solvent admixed with admitted air, has been addressed most commonly by means of carbon absorbers. Those recovery or control systems can become complicated and hence costly in terms of both capital investment and operating expense. Direct loss is sometimes easier to control, but many potential solutions designed for that purpose can contribute to admission of ambient air to the system, resulting in the types of problems mentioned above. Thus, it is not uncommon to find solvent systems used in, for example, the electronics industry for cleaning printed circuit boards or electronic components, to emit relatively large amounts of solvent vapor, on the order of 8 to 10 pounds of solvent per hour.

SUMMARY OF THE INVENTION

The present invention provides an improved emission control system for minimizing the escape of volatile compositions to the atmosphere, particularly solvents associated with industrial cleaning procedures. The present invention advantageously provides such a system, and method for its implementation, which overcomes many of the problems endemic to prior art control systems or solvent recovery techniques. The system of the present invention is designed to provide calculated recoveries well in excess of 99%, eliminating under most practical industrial circumstances all but about 0.5% or less of solvent emission compared to conventional degreasers.

The foregoing, and other advantages, are realized in one aspect of the present invention in a method for controlling atmospheric emission of volatile fluids, comprising the steps of disposing an article to be treated into a chamber capable of maintaining both pressure and effective vacuum, evacuating the chamber to remove virtually all gases, first introducing into the chamber a fluid composition comprised of volatile constituents, such as a solvent for treating the article, recovering the fluid and vapor components of the solvent composition following the treatment step, and subsequently removing residual liquid by flushing the chamber with a drying fluid. Most preferably, the drying fluid is derived from the residual charge of noncondensable gas and solvent vapor within the closed loop system. The temperature of the chamber and its contents may be controlled by heating means such as heating the walls of the chamber or by radiation such as infrared heating.

In a preferred embodiment, the step of recovering the treating or cleaning fluid further comprises the steps of collecting the fluid used during the first processing step and separating it into liquid and gas phases. The method then further comprises the step of fractionating the gas phase, preferably through compression and cooling, to condense and thence recover and recycle volatile constituents. The stripped gas is then preferably heated and used during the second processing step to dry the article contained within the chamber, although it may be used in some circumstances as a desiccating agent without the need to be heated depending on the nature of the process, the gas and the solvent to be expelled from the chamber.

Typically, the chamber is first evacuated by means of a vacuum pump, discharging the contents of the chamber to atmosphere while the chamber is isolated from a recirculating closed loop system. Contrariwise, the chamber is evacuated through the closed loop system following the drying step to enhance the drying process and to return residual solvent vapor to the closed loop system, and the chamber is then isolated before its vacuum is broken. That is most conveniently accomplished by admission of ambient gas, following which the chamber is opened and the article(s) disposed therein for treatment are removed. Dragout is virtually eliminated by removing residual solvent liquid and vapor from the article being processed and from the chamber. Gases admitted into the closed loop system are minimized through these steps of isolation.

Other advantages of the present invention, and a fuller understanding of its operation and the system which implements it, will be appreciated upon an examination of the detailed description which follows, taken in conjunction with the sole Figure of the drawing.

DESCRIPTION OF THE DRAWING

The drawing schematically represents a system suitable to carry out a process in accordance with the present invention.

DETAILED DESCRIPTION OF THE PREFERRED EMBODIMENTS

Figure 1:
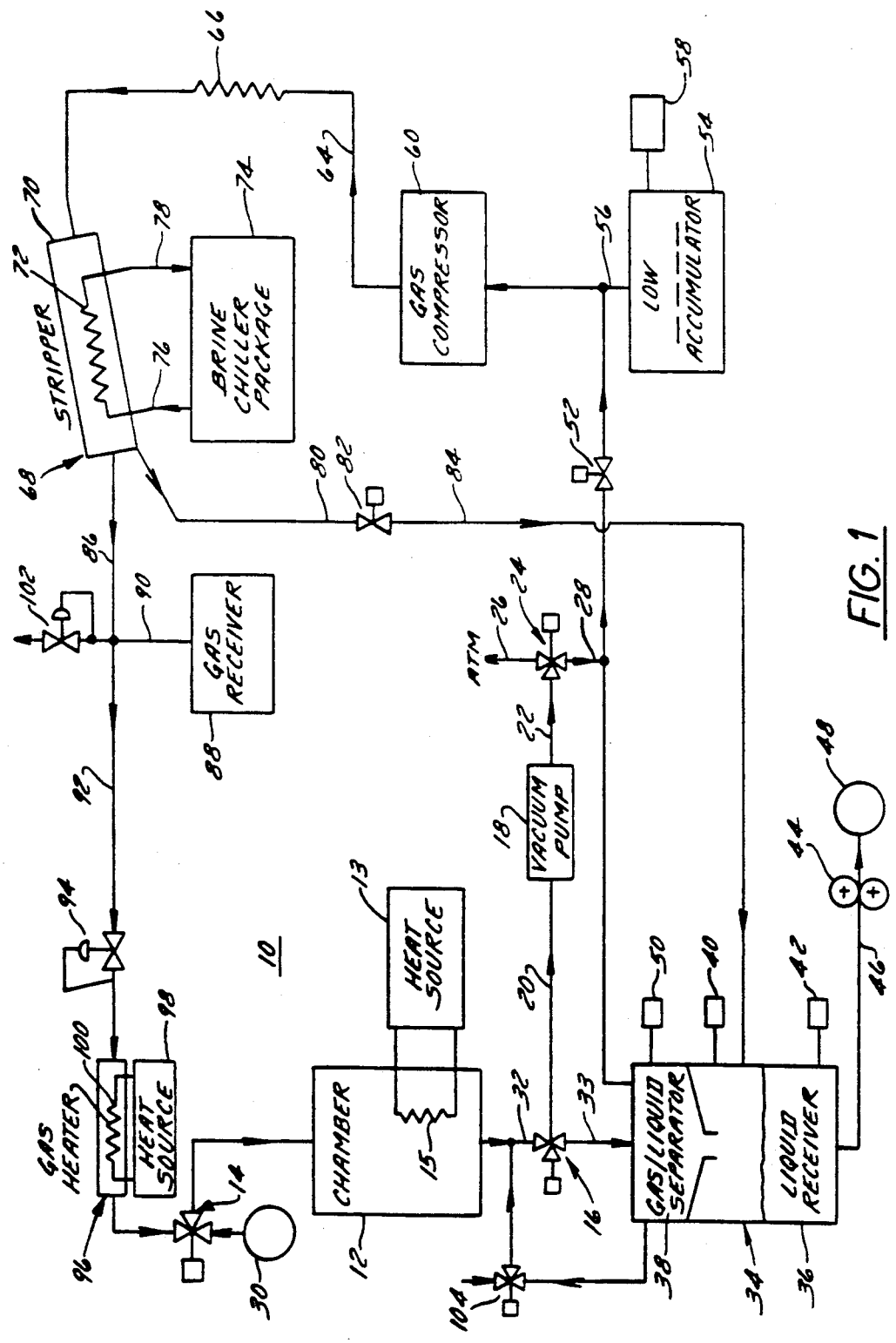

The present invention relates, generally, to emission control systems for minimizing the atmospheric introduction of volatile constituents from fluid compositions used to treat articles as part of or incident to a manufacturing procedure, and a method therefor. The present invention more particularly relates to a vacuum-to-vacuum emission control system for reducing the atmospheric introduction of volatile organic compounds, especially cleaning solvents such as chlorofluorocarbons, hydrochlorofluorocarbons, chlorocarbons, alcohols, hydrocarbons, and other volatile compounds. The present invention provides a recirculating closed loop solvent recovery system having the ability to control solvent consumption performance to a level considerably less than 1% of that experienced with conventional degreasers. Solvent consumption for those products in which solvent is irretrievably absorbed will be somewhat higher. Accordingly, the invention will now be described with reference to the preferred implementation of a solvent recovery system used in conjunction with a cleaning process for removing soils from, e.g., a capillary flow dialyzer, a printed circuit board or metal or plastic parts.

Turning to the figure in the drawing, the emission control system according to the invention, designated generally as 10, is shown to include a treatment chamber designated generally as 12 in which a cleaning or other treatment operation takes place. An important aspect of the emission control system 10 is the ability to isolate the chamber 12 from the remainder of the recirculating closed loop system and thereby control the loss of volatile constituents from the closed loop system or the introduction of gases into the system. This is achieved in the exemplified embodiment by inlet solenoid valves, 14 and 104 and outlet solenoid valve 16. The chamber 12 is operatively associated with a vacuum pump 18, communicating with it via conduit 20 and solenoid valve 16. Vacuum pump 18 communicates alternatively, via a conduit 22 and solenoid valve 24, with either the atmosphere through port 26 or the closed loop system through conduit 28. Accordingly, the interior of chamber 12 may be isolated from the remainder of the closed loop system 10 and its contents may selectively be evacuated or discharged either to the atmosphere or to the closed loop system as demanded by the procedure for which the system is implemented or the stage of operation within that procedure.

The chamber and its contents can be heated by any of a number of heating methods to control its temperature, including heat source 13 and heat exchanger 15 or by infrared radiation, direct conduction or the like. Chamber 12 is sized and configured to receive one or more articles (not shown) to be treated with a fluid composition which is either itself volatile or which is comprised of volatile constituents. Insofar as the chamber serves a principal role of defining a treatment environment separate and distinct from the ambient environment, the chamber 12 also needs to be constructed with sufficient integrity to contain both pressure and vacuum. In the context of the preferred embodiment of the present invention, cleaning processes both above and below ambient pressure may be practiced to take advantage of a wide range of solvents, many, because of their boiling points, are not practical in conventional cleaning processes. Evacuation pressures below ambient may be adequate to practice the current invention, however lower evacuation pressures down to full vacuum will enhance solvent containment efficiency. Regardless, it is important that chamber 12 be designed to maintain both positive and negative levels of pressures with respect to ambient.

The articles to be cleaned in chamber 12 are loaded while the chamber is isolated from the closed loop system by closing solenoid valves 14, 16 and 104, as mentioned above. During loading, gases will enter the interior of the chamber directly and gases will also be either entrained in or carried on or about the articles to be processed. Once the chamber 12 is loaded, and while it remains isolated from the closed loop system, vacuum pump 18 is used to evacuate the interior of chamber 12 and discharge the gas therein to the atmosphere via port 26 of the solenoid valve 24. Once the gases are removed from the interior of chamber 12, the chamber may then be allowed to communicate with the remainder of the closed loop system 10 without undue risk of introducing unwanted material.

After all gases from loading chamber 12 have been discharged, articles within the chamber are ready for treatment, such as a solvent degreasing or a cleaning process, e.g. flushing, spraying, spray-over immersion, ultrasonics, mechanical agitation, etc. The vacuum is broken from inside the closed loop system, by opening solenoid valve 104 to draw gas from gas separator 34. Subsequently, solvent is admitted from a solvent supply 30 via solenoid valve 14 at the inlet of the chamber 12. Solvent is fed into the chamber 12 to carry out the treatment process therein and exits via a line 32, outlet valve 16 and a line 33 to a gas/liquid separator designated generally as 34. The processing fluid, carrying soil, debris, dissolved contamination and entrained gas, is treated in the separator 34 to partition it into a liquid phase and a gas phase. The liquid phase separates gravimetrically to a liquid receiver 36 disposed in the lower confines of the separator 34. The gas phase naturally rises to a gas well 38 in the upper portion of the separator 34.

High and low level switches 40 and 42, respectively, are responsive to the level of the liquid phase within the receiver 36. When the liquid level rises sufficiently to trip the high level switch 40, it energizes a discharge pump 44, which removes liquid from the receiver 36 via a conduit 46 to a solvent reclamation reservoir 48. The solvent is treated in a conventional fashion to remove contaminants from it, and it is then recycled by returning it to the solvent supply reservoir 30.

The gas phase which rises in the well 38 is typically a combination of several components, including higher boiling point solvent vapor, gases which are generated during the treatment process, and residual air constituting the principal components. The gases collect in the well 38 until its pressure rises sufficiently that it must be tapped or bled from the separator 34. A switch 50 senses the pressure buildup of gas within the well 38 and opens solenoid valve 52. Gas is thereby admitted to a low pressure accumulator 54 via a conduit 56. A switch 58 is disposed in cooperative relation with the accumulator 54, and is tripped when the pressure in the accumulator achieves a preset level. At that time, switch 58 applies power to a gas compressor 60, which compresses the gas and discharges it to line 64 at the outlet of the compressor. The compressor 60 will continue to operate until the pressure in the low pressure accumulator 54 drops to an established level; likewise, gas will be bled from the well 38 for so long as the pressure head therein remains above the setting on pressure switch 50. This arrangement permits the compressor to remove and compress gas from the well 38 without experiencing "short cycling," which could otherwise occur due to minor fluctuations in pressure in the well 38.

Compressed gas exiting the compressor 60 via the line 64 is delivered to an after cooler 66 for removing the heat of compression. Thereafter the gas is routed to a stripper designated generally as 68. The stripper is comprised of a housing 70 for a heat exchanger 72 across which the compressed gas flows. The heat exchanger 72 is chilled by a brine solution, housed in brine chiller package 74 which supplies a cold brine solution to heat exchanger 72 via an inlet 76 and removes it through an outlet 78.

The stripper 68 is controlled to provide a temperature below the dew point of the volatile constituents of the compressed gas. These constituents, typically solvent vapor and the like, condense and are ported from the stripper via line 80, through solenoid valve 82 and conduit 84 to the liquid receiver 36. In this fashion, condensed volatile gas, which may serve as useful solvent, is returned to the system for that purpose.

Gas which has been stripped of the higher boiling point constituents is tapped from the stripper 68 via an outlet port communicating with conduit 86 and is admitted to a high pressure accumulator or gas receiver 88 via line 90. Gas receiver 88 houses the stripped gas which has the least solvent content of the gas in the closed loop system, on a weight of solvent per unit of volume of gas basis. This gas is supplied through line 92 and a pressure responsive valve 94 to a gas heater designated generally as 96. The gas heater 96 is comprised of a heat source 98 and a heat exchanger 100. To the extent that the volume of the stripped gas in the receiver 88, rises to too great a level resulting in increased pressure in the system, e.g. from gas ingestion due to incomplete vacuum being achieved in the initial evacuation steps, it is purged from the system via pressure relief valve 102. The gas released by valve 102 can be further treated with a carbon adsorber to remove most of the small amount of solvent that the released gas carries with it.

After the parts contained in chamber 12 have been cleaned (during which liquid solvent is admitted to the chamber), the parts are dried or otherwise freed from residual liquid solvent. This is achieved by recirculating heated, stripped gas from heater 96 through valve 14 to the interior of the chamber 12. Heated gas flowing through the chamber vaporizes liquid solvent and thus effects a drying operation by evaporating residual liquid solvent. That gas continues through the chamber, returning through solenoid valve 16 to the gas well 38 in the separator 34 and back to the gas receiver 88, as described above.

The drying function served by heated, stripped gas may equally well be achieved under certain circumstances by a drying gas which does not require heating. For example, depending on the volatility of the fluid composition sought to be purged from the chamber 12, the throughput of drying gas, the physical configuration of the article(s) to be treated, and similar factors, all within the control of the designer, determine whether the stripped gas emanating from stripper 68 may be used directly without the need to be heated and, accordingly, may optionally be heated to greater or lesser degrees to achieve the drying function sought by the designer.

Once the parts have been treated and then dried as described above, a further drying and gas removal step is carried out in the chamber. Chamber 12 is isolated at the inlet, by closing solenoid valves 14 and 104 and at the outlet by closing solenoid valve 16. Vacuum pump 18 is then connected to the chamber by opening solenoid valve 16 to draw down the contents which remain in the chamber 12. These consist essentially of stripped gas and such volatile components as it has entrained, and possibly some residual solvent liquid not removed in the previous drying steps. The residuum is drawn through solenoid valve 16 by vacuum pump 18 and pumped through solenoid 24 and conduit 28 to the gas side of the closed loop system, downstream of the well 38, being directed to the low pressure accumulator 54.

An adequate vacuum is drawn to remove substantially all of the solvent vapor and other gases before the vacuum pump is deenergized. At that juncture the chamber 12, housing clean and dry articles, is ready to be opened to remove them. Solenoid valve 104 is opened to break the vacuum in the chamber 12 to some outside source of gas, e.g. the environment, and allow the operator to gain access to remove the cleaned articles. At that time, the chamber 12 is ready for receiving a new load of articles to be cleaned.

Although the above disclosure of the operation of the system is specific to a simple treatment, purging and drying operation, it should be noted that the system can be used with other than conventional solvents. In this regard, if the chamber pressure is raised, compounds that are gases under normal room conditions (e.g., R-12 or R-22 which boil, respectively, at $-21.7°$ F. and $-41°$ F. at one atmosphere pressure) can be used as a liquid solvent at 130° F. if the pressure is maintained above 185 psig and 300 psig, respectively. The significance of this capability is the ability to use many beneficial solvents in the place of CFC's. The system has the capability of changing the state of being of the solvent from liquid to vapor and back again simply by changing pressure. This is of particular importance in cleaning small crevices where it is necessary to get solvent liquid into the crevice and get it out again, carrying contaminants with it.

As an example of the above, envision a soluble contaminant such as PCB buried in a coil of a transformer winding. Initially, the coil is disposed in the chamber 12, solenoid valve 16 is opened and vacuum pump 18 activated to remove gases from the chamber. Solenoid 16 is closed to seal the chamber and solenoid 14 is opened to the solvent supply. The vacuum in the chamber will cause some of the solvent to evaporate and be drawn into the interstices of the transformer windings. The pressure in the chamber can be raised by a pump (not shown) to a point where, at a specific temperature, the solvent condenses. As the solvent condenses, the volume decreases drawing more solvent vapor into the coil to fill the voids created by the solvent that has already condensed. The coil fills with the liquid solvent and dissolves the PCB contaminant.

The solenoid valve 14 is closed and solenoid 16 opened to allow its vacuum pump 18 to decrease the pressure in the chamber. The liquid solvent will boil drawing the PCB contaminated liquid out of the coil. This can be repeated as many times as deemed necessary to clean the coil once all of the noncondensable gases have been removed by this initial vacuum.

As is evident from the foregoing, the system is isolated from contaminants and gases introduced or potentially introduced, through the chamber 12. The chamber is the only component open to the atmosphere and potential source of contaminants and gases. Conversely, the closed loop system is operational in the treatment of articles within the chamber 12, such as solvent cleaning, only during times when it is otherwise isolated from these sources of gases and contamination. Thus, solvent emission, either directly or indirectly, is substantially precluded, within the general parameters mentioned above.

The system is broadly adaptable to treat a wide variety of articles. Any article containing manufacturing soil which must be removed either during the course of a manufacturing procedure or at the conclusion thereof, and which is susceptible to such a treatment by a volatile composition, may adequately be treated in the system 10. Exemplary of a few applications are the solvent cleaning of electronic components or systems and the solvent cleaning of medical devices or metal or plastic parts. Additionally, it is envisioned that the system can be utilized in the control of emissions from more routine processes, including, for example, dry cleaning. Likewise, a wide array of volatile compositions may adequately be handled by system 10. Appropriately designing the gas compressor and stripping components of the system to achieve proper condensing parameters allows the designer to adapt the instant system to a wide range of practical utilities. For example, using a CFC-113 chlorofluorocarbon solvent, it has been determined that a compression of 60 PSIG and a heat exchange temperature at the stripper of $-26°$ F. will leave a solvent relative humidity of less than about 9%. More generally, however, it has been determined that the dew point leaving the stripper is virtually the same as the temperature of the heat exchanger surface itself, while the dry bulb temperature of the stripped gas may be about $15°-20°$ F. or higher. Consequently, guided by the principles set forth herein, those ordinarily skilled in this art will have no difficulty designing systems having appropriate capacity and operational characteristics to accommodate virtually all customarily encountered volatile solvents.

Thus, it should be apparent that there has been provided in accordance with the present invention an emission control system for fluid compositions having volatile constituents and method thereof that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An emission control system for fluid compositions composed of volatile gas and liquid components used to process an article, said system comprising:
    (a) a chamber for receiving the article to be treated by contact with or exposure to the fluid composition;
    (b) means for establishing a predetermined pressure in said chamber;
    (c) means for passing the fluid composition through said chamber; means for collecting the fluid composition discharged from the chamber, and
    d) means for separating the gas and liquid components of the fluid composition discharged from said chamber.

2. The system according to claim 1 including: closed loop means to heat the chamber and its contents.

3. The system according to claim 1 including:
    closed loop means for recirculating the gas component to said chamber as a drying agent.

4. The system according to claim 3 wherein said closed loop recirculating means includes:
    means for stripping volatile constituents from said gas component prior to return of said gas to said chamber.

5. The system according to claim 4 wherein said closed loop recirculating means includes a gas compressor for pressurizing the gas component prior to passing to said stripper means and a gas receiver for storing the gas component after passing through said stripper means.

6. The system according to claim 3 wherein said closed loop recirculating means includes:
    means for heating the gas component prior to entering said chamber.

7. The system according to claim 3 including first porting means for selectively introducing to said chamber either the fluid composition or the recirculated gas component.

8. The system according to claim 7 including second porting means for selectively connecting said chamber to either said establishing means or said separating means.

9. The system according to claim 8 including a third porting means for selectively connecting said chamber to an outside source of gas or to gas within said closed loop means.

10. The system according to claim 9 including a fourth porting means for connecting said establishing means to the atmosphere or to said closed loop means.

11. The system according to claim 3 including means for controlling the volume of noncondensable gas in said closed loop means.

12. An emission control system for fluid compositions composed of volatile gas and liquid components used to treat or clean an article as part of or incident to a manufacturing process, said system comprising:
    (a) a chamber for receiving the article and a closed loop system for returning gases evacuated from said chamber back to said chamber;
    (b) means for evacuating the gas from said chamber and discharging the contents outside the closed loop system;
    (c) means for admitting the fluid composition into said chamber to clean the article;
    (d) means for discharging the fluid composition from the chamber;
    (e) means for separating the gas and liquid components of said discharged fluid composition;
    (f) means for discharging the gas component into the closed loop system, and
    (g) means for admitting gas from an outside source into said chamber for removing the processed article.

13. The system according to claim 12 wherein said gas component is recycled through the closed loop system back to said chamber for drying the article.

14. The emission control system of claim 13 including heating means in said closed loop system for heating said gas component prior to delivery thereof to said chamber.

15. The emission control system of claim 14 wherein said heating means includes a heat exchanger upstream of said gas receiver for condensing in the volatile liquid components.

16. The emission control system of claim 12, wherein said evacuating means comprises a vacuum pump.

17. The emission control system of claim 16 including means for selectively connecting said vacuum pump to the atmosphere or the closed loop system.

18. The emission control system of claim 12 wherein said means for separating includes a liquid receiver, said system further including a liquid reclamation reservoir in fluid communication with said liquid receiver.

19. The emission control system of claim 12 wherein said closed loop system further includes a gas compressor for pressurizing the gas component and a gas receiver for accumulating the pressurized gas component.

20. The system according to claim 12 including means to heat the chamber and its contents.

21. An emission control system for fluid compositions composed of volatile gas and liquid components used to process an article, said system comprising:
 a chamber for receiving the article,
 a pump for evacuating said chamber,
 means for passing the fluid composition through the chamber,
 a separator connected to said chamber to separate the gas and liquid components of the fluid composition discharged from said chamber,
 a closed loop recirculating system for returning the gas component of the fluid composition to the chamber,
 said recirculating system including a stripper for stripping the volatile components from said gas component prior to return to said chamber, a heater for heating the gas components prior to entering said camber, a compressor for pressurizing the gas component prior to passing to said stripper, a gas receiver for storing the gas component after passing through said stripper, and
 a pressure relief valve for controlling the volume of noncondensable gas in the recirculating system.

* * * * *

UNITED STATES PATENT AND TRADEMARK OFFICE
CERTIFICATE OF CORRECTION

PATENT NO. : 5,106,404
DATED : April 21, 1992
INVENTOR(S) : David C. H. Grant

It is certified that error appears in the above-identified patent and that said Letters Patent is hereby corrected as shown below:

Col. 8, line 15, after "gas" insert -- component -- .

Col. 9, line 10, after "condensing" delete "in" .

Signed and Sealed this

Twenty-first Day of September, 1993

Attest:

BRUCE LEHMAN

Attesting Officer    Commissioner of Patents and Trademarks